(12) United States Patent
Fahn (10) Patent No.: US 10,225,611 B2
(45) Date of Patent: Mar. 5, 2019

(54) POINT-TO-POINT CONTENT NAVIGATION USING AN AUXILIARY DEVICE

(71) Applicant: Samsung Electronics Co., Ltd., Suwon-si, Gyeonggi-do (KR)

(72) Inventor: Paul Fahn, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 14/190,026

(22) Filed: Feb. 25, 2014

(65) Prior Publication Data

US 2015/0067508 A1     Mar. 5, 2015

Related U.S. Application Data

(60) Provisional application No. 61/873,020, filed on Sep. 3, 2013.

(51) Int. Cl.
*G06F 3/048* (2013.01)
*H04N 21/462* (2011.01)
(Continued)

(52) U.S. Cl.
CPC ....... *H04N 21/4622* (2013.01); *G11B 27/105* (2013.01); *G11B 27/34* (2013.01); *H04N 21/4126* (2013.01); *H04N 21/42209* (2013.01); *H04N 21/42224* (2013.01); *H04N 21/4307* (2013.01)

(58) Field of Classification Search
CPC .................................................. H04N 21/4622
See application file for complete search history.

(56) References Cited

U.S. PATENT DOCUMENTS 6,567,984 B1     5/2003    Allport et al.
6,809,830 B1    10/2004    Lafky
(Continued)

FOREIGN PATENT DOCUMENTS

KR    10-2011-0093844 A     8/2011
WO         2009151635 A1    12/2009

OTHER PUBLICATIONS

European Search Report dated Mar. 14, 2014 for European Patent Application No. 14150416.7 from European Patent Office, pp. 1-8, Munich Germany.
(Continued)

*Primary Examiner* — Jeffrey A Gaffin
*Assistant Examiner* — Mohamed Abou El Seoud
(74) *Attorney, Agent, or Firm* — Sherman IP LLP; Kenneth L. Sherman; Hemavathy Perumal (57) ABSTRACT

One embodiment provides a system comprising a content navigation application module including a user interface unit, a synchronization unit, and a content navigation control unit. The user interface unit generates first metadata information associated with a content frame of a first piece of content. The synchronization unit synchronizes the display of the first metadata information with the display of the content frame during content playback of said first piece of content. The first metadata information and the content frame are displayed on different devices. The content navigation control unit enables content navigation based on user interaction with the first metadata information when the first metadata information is displayed.

23 Claims, 7 Drawing Sheets

(51) Int. Cl.
*G11B 27/10* (2006.01)
*G11B 27/34* (2006.01)
*H04N 21/41* (2011.01)
*H04N 21/422* (2011.01)
*H04N 21/43* (2011.01)

(56) References Cited

U.S. PATENT DOCUMENTS

| | | |
|---|---|---|
| 7,136,874 B2 | 11/2006 | Mercer |
| 7,181,010 B2 | 2/2007 | Russ |
| 7,309,287 B2 | 12/2007 | Miyamoto et al. |
| 7,398,474 B2 | 7/2008 | Yan |
| 7,634,263 B2 | 12/2009 | Louch et al. |
| 7,716,700 B2 | 5/2010 | Carlucci |
| 7,748,000 B2 | 6/2010 | Genty et al. |
| 7,948,476 B2 | 5/2011 | Goto |
| 7,949,680 B2 | 5/2011 | Yanagita et al. |
| 7,987,491 B2 | 7/2011 | Reisman et al. |
| 8,261,261 B2 | 9/2012 | Tseng |
| 8,285,199 B2 | 10/2012 | Hsu et al. |
| 8,331,772 B1 | 12/2012 | Zdepski |
| 8,370,518 B2 | 2/2013 | Chen et al. |
| 8,386,563 B2 | 2/2013 | Parks et al. |
| 8,421,808 B2 | 4/2013 | Ishii et al. |
| 8,516,528 B2 | 8/2013 | Sandoval et al. |
| 8,549,115 B2 | 10/2013 | Park et al. |
| 8,554,938 B2 | 10/2013 | Mittal |
| 8,589,909 B2 | 11/2013 | Hu |
| 8,589,986 B2 | 11/2013 | McCoy |
| 8,726,189 B2 | 5/2014 | Weber et al. |
| 8,787,280 B2 | 7/2014 | Patil |
| 8,937,534 B2 | 1/2015 | Kreiner et al. |
| 8,943,409 B2 | 1/2015 | Bryant-Rich |
| 8,959,506 B2 | 2/2015 | Kinsella |
| 8,974,282 B2 | 3/2015 | Haltovsky et al. |
| 8,990,703 B2 | 3/2015 | Nhiayi |
| 9,252,950 B2 | 2/2016 | Caspi |
| 9,264,753 B2 | 2/2016 | Xu |
| 2002/0163532 A1* | 11/2002 | Thomas ............ G06F 17/30814 715/723 |
| 2007/0171201 A1* | 7/2007 | Pi ............................. G06F 3/021 345/157 |
| 2007/0201833 A1 | 8/2007 | Cherna |
| 2009/0168090 A1 | 7/2009 | Nakano et al. |
| 2009/0249429 A1 | 10/2009 | Sullivan |
| 2009/0327894 A1* | 12/2009 | Rakib .................... G11B 27/34 715/719 |
| 2010/0023852 A1 | 1/2010 | Chou |
| 2010/0046009 A1 | 2/2010 | Pandit et al. |
| 2010/0060572 A1 | 3/2010 | Tsern et al. |
| 2010/0097650 A1 | 4/2010 | Seo |
| 2010/0192206 A1 | 7/2010 | Aoyama |
| 2010/0197220 A1 | 8/2010 | Zilliacus |
| 2010/0262673 A1 | 10/2010 | Chang et al. |
| 2010/0277365 A1 | 11/2010 | Ha et al. |
| 2011/0083069 A1 | 4/2011 | Paul et al. |
| 2011/0099157 A1 | 4/2011 | Lebeau et al. |
| 2011/0214121 A1 | 9/2011 | Gentile et al. |
| 2011/0289493 A1 | 11/2011 | Keefe et al. |
| 2012/0008910 A1 | 1/2012 | Tamura et al. |
| 2012/0050183 A1 | 3/2012 | Lee et al. |
| 2012/0066715 A1 | 3/2012 | Jain et al. |
| 2012/0151530 A1* | 6/2012 | Krieger .............. H04N 5/44543 725/51 |
| 2013/0094591 A1* | 4/2013 | Laksono ................ H04N 19/44 375/240.25 |
| 2013/0108239 A1 | 5/2013 | Ryer |
| 2013/0132605 A1 | 5/2013 | Kocks et al. |
| 2014/0010121 A1 | 1/2014 | Patil et al. |
| 2014/0082610 A1 | 3/2014 | Wang |
| 2014/0089414 A1 | 3/2014 | Patil et al. |
| 2014/0099973 A1 | 4/2014 | Cecchini et al. |
| 2014/0165112 A1 | 6/2014 | Freeman et al. |
| 2014/0170978 A1 | 6/2014 | Wolman et al. |
| 2014/0215457 A1 | 7/2014 | Gava et al. |
| 2015/0063779 A1 | 3/2015 | Fahn et al. |

OTHER PUBLICATIONS

Wikipedia, "Secure Shell-SSH", Jan. 26, 2013, pp. 1-9, Wikipedia.org, United States (downloaded on Jul. 30, 2014).

International Search Report and Written Opinion dated Mar. 31, 2014 for International Application No. PCT/KR2013/011498 from Korean Intellectual Property Office, pp. 1-8, Daejeon, Republic of Korea.

U.S. Non-Final Office Action for U.S. Appl. No. 13/751,821 dated May 21, 2014.

U.S. Non-Final Office Action for U.S. Appl. No. 13/751,821 dated May 20, 2015.

Park, M. et al., "A perceptive remote-control 3D TV interface", The International Society for Optical Engineering, Apr. 13, 2007, pp. 1-2, SPIE Newsroom, United States.

Bove Jr., V.M. et al., "Hyperlinked television research at the MIT Media Laboratory" IBM Systems Journal, Jul. 2000, pp. 470-478, vol. 39, Nos. 3&4, IBM, United States.

U.S. Final Office Action for U.S. Appl. No. 13/751,821 dated Dec. 19, 2014.

U.S. Non-Final Office Action for U.S. Appl. No. 14/023,215 dated Jan. 16, 2015.

U.S. Final Office Action for U.S. Appl. No. 14/023,215 dated Aug. 3, 2015.

U.S. Final Office Action for U.S. Appl. No. 13/751,821 dated Nov. 4, 2015.

U.S. Advisory Action for U.S. Appl. No. 14/023,215 dated Oct. 22, 2015.

U.S. Non-Final Office Action for U.S. Appl. No. 13/751,821 dated Mar. 4, 2016.

U.S. Non-Final Office Action for U.S. Appl. No. 14/023,215 dated Apr. 6, 2016.

U.S. Non-Final Office Action for U.S. Appl. No. 14/191,943 dated Feb. 16, 2016.

U.S. Final Office Action for U.S. Appl. No. 14/191,943 dated Jun. 17, 2016.

U.S. Advisiory Action for U.S. Appl. No. 13/751,821 dated Dec. 20, 2016.

U.S. Advisory Action for U.S. Appl. No. 14/023,215 dated Jan. 12, 2017.

U.S. Non-Final Action for U.S. Appl. No. 14/191,943 dated Jan. 11, 2017.

U.S. Non-Final Office Action for U.S. Appl. No. 13/751,821 dated Mar. 9, 2017.

U.S. Non Final Office Action for U.S. Appl. No. 14/023,215 dated Feb. 23, 2017.

U.S. Advisory Action for U.S. Appl. No. 13/751,821 dated Jan. 25, 2016.

U.S. Final Office Action for U.S. Appl. No. 13/751,821 dated Sep. 6, 2016.

U.S. Final Office Action for U.S. Appl. No. 14/023,215 dated Sep. 23, 2016.

U.S. Advisory Action for U.S. Appl. No. 14/191,943 dated Oct. 4, 2016.

U.S. Final Office Action for U.S. Appl. No. 14/191,943 dated Jun. 30, 2017.

U.S. Final Office Action for U.S. Appl. No. 13/751,821 dated Oct. 3, 2017.

U.S. Final Office Actian for U.S. Appl. No. 14/023,215 dated Aug. 30, 2017.

U.S. Notice of Allowance for U.S. Appl. No. 14/191,943 dated Oct. 10, 2017.

U.S. Advisory Action for U.S. Appl. No. 13/751,821 dated Jan. 10, 2018.

U.S. Non-Final Office Action for U.S. Appl. No. 13/751,821 dated Apr. 12, 2018.

(56) References Cited

OTHER PUBLICATIONS

European Examination Report dated Nov. 9, 2017 for European Application No. 14150416.7 from European Patent Office Action, pp. 1-5, Munich, Germany.
U.S. Advisory Action for U.S. Appl. No. 14/023,215 dated Dec. 13, 2017.

* cited by examiner

POINT-TO-POINT CONTENT NAVIGATION USING AN AUXILIARY DEVICE

CROSS-REFERENCE TO RELATED APPLICATIONS

This application claims priority to U.S. Provisional Patent Application Ser. No. 61/873,020, filed on Sep. 3, 2013, which is incorporated herein by reference.

TECHNICAL FIELD

One or more embodiments relate generally to content navigation, and in particular a point-to-point navigation using an auxiliary device.

BACKGROUND

Conventionally, a user may navigate through content playing on a device by manually pressing buttons representing navigation commands on the device or a remote control for the device.

SUMMARY

One embodiment provides a system comprising a content navigation application module including a user interface unit, a synchronization unit, and a content navigation control unit. The user interface unit generates first metadata information associated with a content frame of a first piece of content. The synchronization unit synchronizes the display of the first metadata information with the display of the content frame during content playback of said first piece of content. The first metadata information and the content frame are displayed on different devices. The content navigation control unit enables content navigation based on user interaction with the first metadata information when the first metadata information is displayed.

These and other aspects and advantages of one or more embodiments will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of one or more embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One embodiment provides a system comprising a content navigation application module including a user interface unit, a synchronization unit, and a content navigation control unit. The user interface unit generates first metadata information associated with a content frame of a first piece of content. The synchronization unit synchronizes the display of the first metadata information with the display of the content frame. The first metadata information and the content frame are displayed on different devices. The content navigation control unit enables content navigation based on user interaction with the first metadata information when the first metadata information is displayed.

Figure 1:
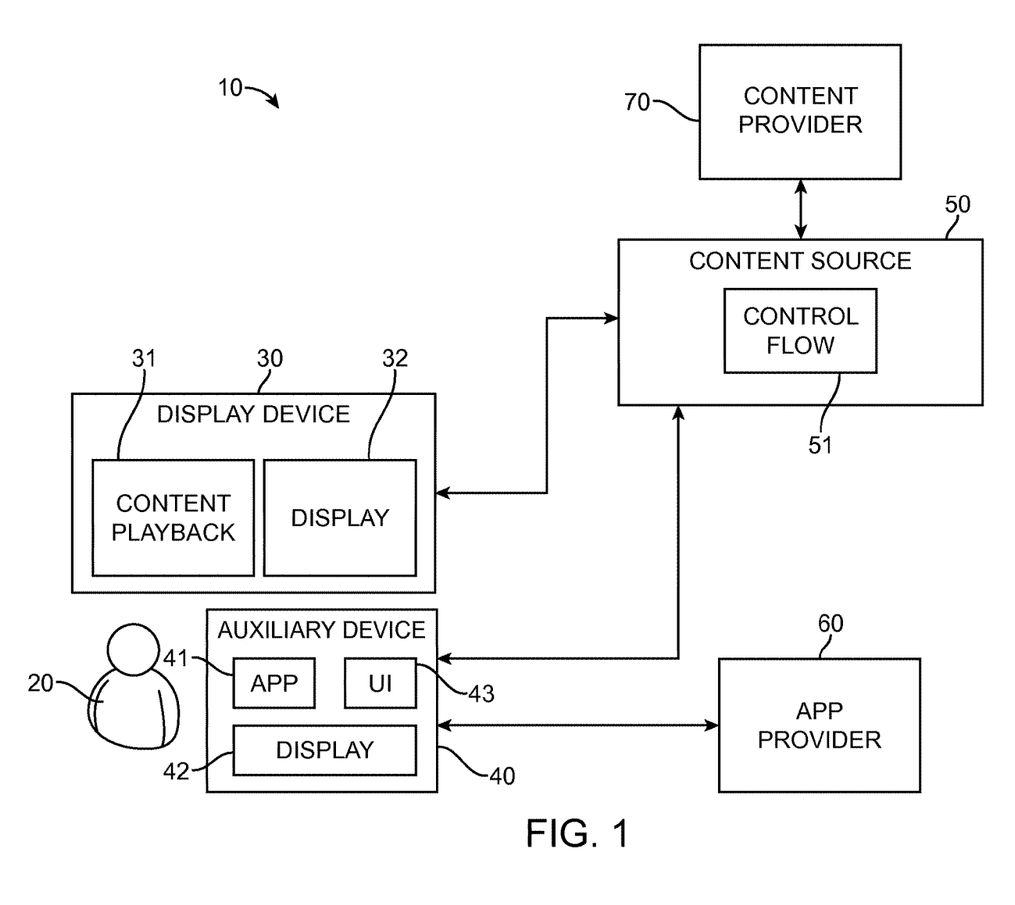
FIG. 1 illustrates a block diagram of a system for point-to-point content navigation, in accordance with an embodiment of the invention.

FIG. 1 illustrates a block diagram of a system 10 for point-to-point content navigation, in accordance with an embodiment of the invention. The system 10 comprises an electronic display device 30. The display device 30 may be an appliance, a personal computer (PC), a television (TV) (e.g., a smart TV), or a mobile device (e.g., a laptop computer, a mobile phone such as a smart phone, etc.).

A user 20 may utilize the display device 30 for content playback. The display device 30 comprises a content playback unit 31 for enabling playback of content (e.g., audio content, video content, images, photos, documents, and/or audiovisual content such as movies, television shows, episodes of television programs, etc.), and a primary display unit 32 for displaying the content and/or visuals associated with the content.

The system 10 further comprises an auxiliary device 40 that provides the user 20 with metadata associated with content displayed on the display device 30. The auxiliary device 40 comprises a point-to-point content navigation application ("app") 41 for providing metadata associated with the content, and a secondary display unit 42 for displaying the metadata. The metadata displayed on the auxiliary device 40 changes during playback of the content on the display device 30. Specifically, the metadata displayed on the auxiliary device 40 is synchronized with the content displayed on the display device 30. The auxiliary device 40 may further comprise a user interface unit ("UI") 43 (e.g., keyboard, touch screen, keypad, pointing device) for allowing enabling user interaction with the metadata displayed on the auxiliary device 40. As described in detail later herein, the point-to-point content navigation app 41 generates, based on user interaction with the metadata displayed on the auxiliary device 40, control signals for controlling content displayed on the display device 30. The point-to-point content navigation app 41 allows a user 20 to jump from a current point (e.g., current content frame) of the content displayed to a different point (e.g., different content frame) of either the same content or different content.

The point-to-point content navigation app 41 is a software application configured to run on the auxiliary device 40. The user 20 may download one or more applications 41 from an application provider 60 (e.g., a content provider, a third party) to the auxiliary device 40 over a connection (e.g., a wireless connection, a wired connection, or a combination of the two). The auxiliary device 40 may also be pre-loaded with one or more applications 41. Each point-to-point content navigation app 41 is configured to provide metadata specific to particular content. For example, a user 20 may download a point-to-point content navigation app 41 that specifically provides metadata for episodes of the television program "Seinfeld".

The system 10 further comprises a content source 50. The content source 50 comprises a content flow application module 51 for providing content to the display device 30 for display, and controlling, based on one or more control signals from a point-to-point content navigation app 41 running on the auxiliary device 40, the display of the content on the display device 30. The content flow application module 51 provides the content to the display device 30 over a connection (e.g., a wireless connection, a wired connection, or a combination of the two). The content provided may originate from a content provider 70, an optical disk or a memory unit of the content source 50. In one embodiment, the content source 50 is an Internet-based cloud service that streams content to the display device 30 for display. In another embodiment, the content source 50 is a local/in-home electronic device (e.g., a set-top box connected with the display device 30, a local media player such as a Blu-Ray player).

Figure 2:
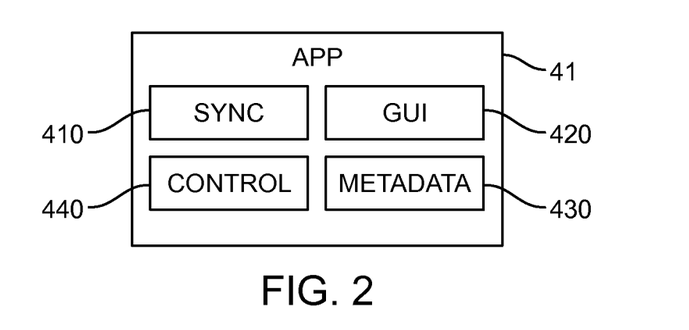
FIG. 2 is a block diagram of an example point-to-point content navigation app, in accordance with an embodiment of the invention.

FIG. 2 is a block diagram of an example point-to-point content navigation app 41, in accordance with an embodiment of the invention. The point-to-point content navigation app 41 comprises a synchronization ("sync") unit 410 for synchronizing the display of metadata on the auxiliary device 40 with the display of content on the display device 30, a graphical user interface (GUI) unit 420 for generating pages 200 of metadata associated with the content for display on the auxiliary device 40, a content navigation control unit 440 for enabling content navigation based on user interaction with the metadata displayed on the auxiliary device 40, and a memory unit 430 for maintaining the metadata associated with the content.

Figure 3:
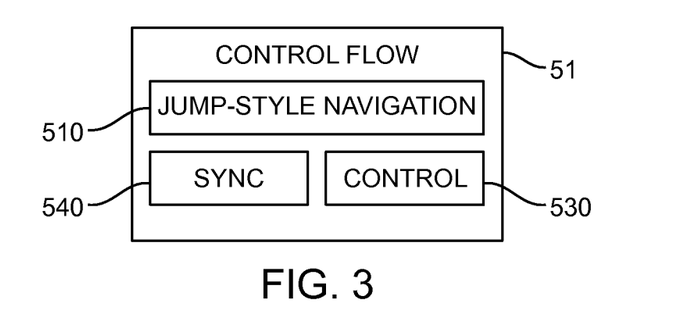
FIG. 3 is a block diagram of an example control flow application module, in accordance with an embodiment of the invention.

FIG. 3 is a block diagram of an example control flow application module 51, in accordance with an embodiment of the invention. The control flow application module 51 comprises a jump-style navigation module 510 for adjusting/changing content provided to the display device 30 by jumping to a time or content frame of a piece of content based on control signals received from a point-to-point content navigation app 41. The control flow application module 51 further comprises a synchronization ("sync") module 540 that assists with synchronizing the display of metadata on the auxiliary device 40 with the display of content on the display device 30 by providing timing information for the content to the sync module 410. The timing information may identify a current content frame of the content and/or a time indicator indicating a current point within the content that is currently displayed. The control flow application module 51 further comprises a control module 530 for controlling the content provided to the display device 30.

Figure 4:
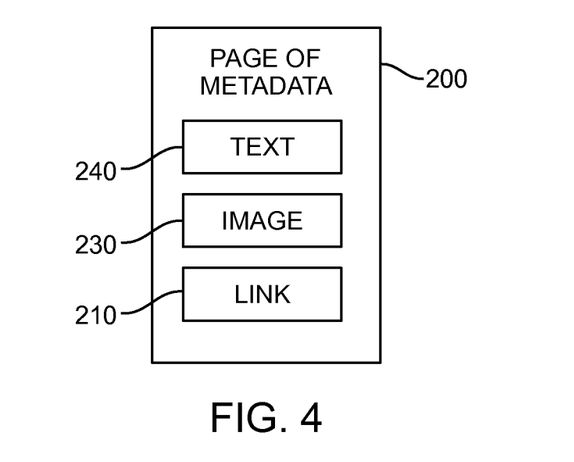
FIG. 4 illustrates an example page of metadata, in accordance with an embodiment of the invention.

FIG. 4 illustrates an example page 200 of metadata, in accordance with an embodiment of the invention. In one embodiment, the GUI unit 420 of a point-to-point content navigation app 41 renders a hyperlink-style GUI interface including a page 200 of metadata in the form of HTML-based content. The page 200 includes one or more texts areas 240, one or more image areas 230, and one or more selectable navigation links/buttons 210. Each link/button 210 provides a user 20 with the option of jumping from a current point in a piece of content to another point within the same piece of content (e.g., an earlier content scene/frame referenced in the current dialogue) or a different piece of content (e.g., an earlier episode of a television program, another movie title within a movie franchise). When the user 20 selects the link/button 210 using the user interface 43 of the auxiliary device 40, the content displayed on the display device 30 will jump to the point in the content referenced by the selected link/button 210.

Figure 5:
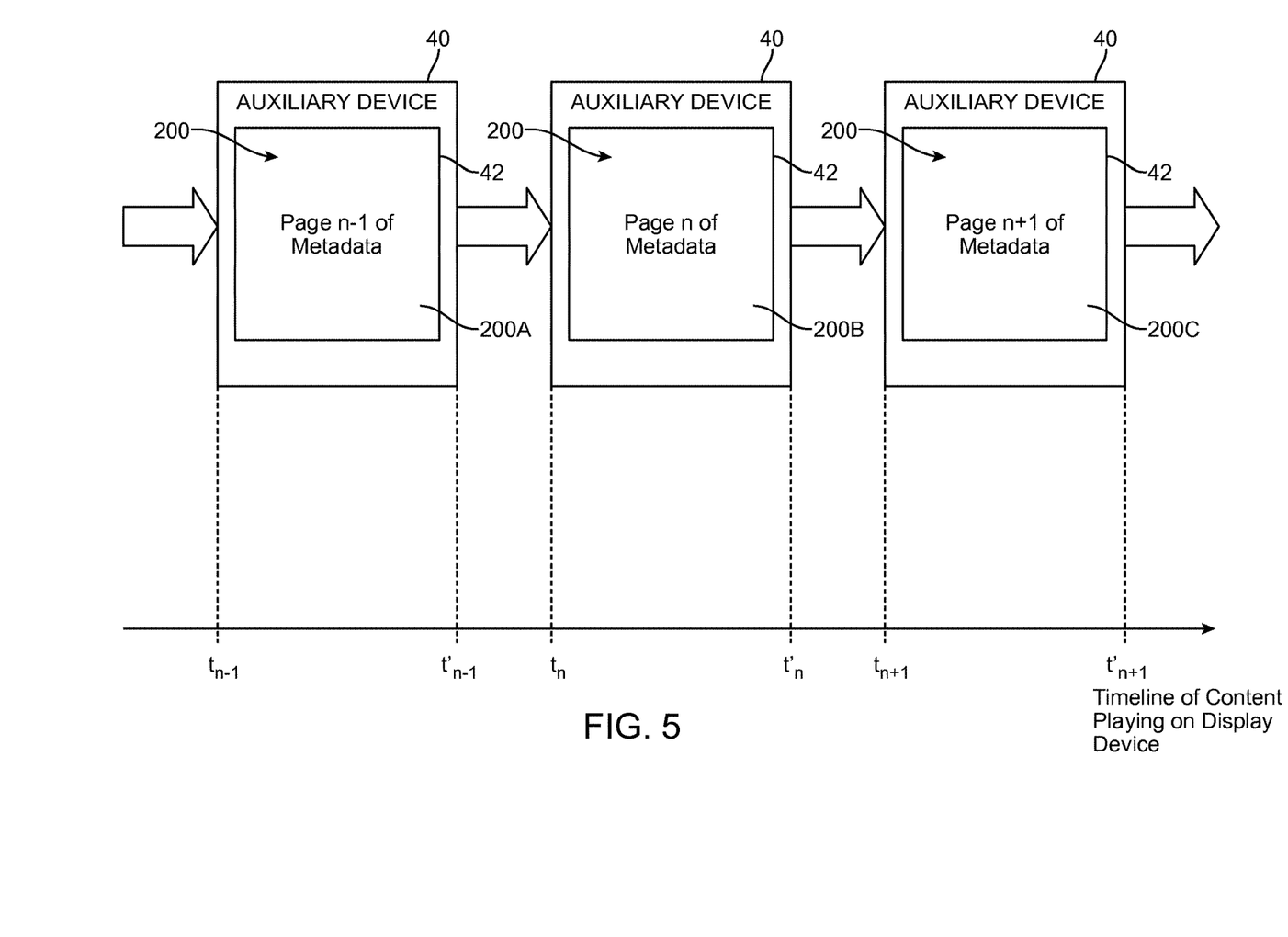
FIG. 5 is a timeline illustrating different pages of metadata displayed on the auxiliary device during content playback of content on the display device, in accordance with an embodiment of the invention.

FIG. 5 is a timeline illustrating different pages 200 of metadata displayed on the auxiliary device 40 during content playback of content on the display device 30, in accordance with an embodiment of the invention. A point-to-point content navigation app 41 running on the auxiliary device 40 generates one or more pages 200 of metadata for display on the auxiliary device 40. The display of metadata on the auxiliary device 40 is synchronized with the content displayed on the display device 30. During content playback of the content, the metadata displayed on the auxiliary device 40 changes based on the current frame/scene of the content displayed. Each page 200 of metadata includes metadata associated with dialogue, characters, actors, points of interest and/or other items occurring within a particular content frame.

As shown in FIG. 5, different pages 200 of metadata may be displayed on the auxiliary device 40 at different times during content playback of content. Each page 200 of metadata has a corresponding start time and a corresponding end time. A start time for a page 200 of metadata indicates when, during the content playback of the content, to begin displaying the page 200 on the auxiliary device 40. An end time for a page 200 of metadata indicates when, during the content playback of the content, to stop displaying the page 200 on the auxiliary device 40. For example, the point-to-point content navigation app 41 provides a first page 200A of metadata ("Page n−1 of Metadata") for display on the auxiliary device 40 beginning at corresponding start time $t_{n-1}$ and ending at corresponding end time $t'_{n-1}$, wherein the first page 200A includes metadata specific to content frames/scenes within times $t_{n-1}$ and $t'_{n-1}$ of the content. The point-to-point content navigation app 41 provides a second page 200B of metadata ("Page n of Metadata") for display on the auxiliary device 40 beginning at corresponding start time $t_n$ and ending at corresponding end time $t'_n$, wherein the second page 200B includes metadata specific to content frames/scenes within times $t_n$ and $t'_n$ of the content. The point-to-point content navigation app 41 provides a third page 200C of metadata ("Page n+1 of Metadata") for display on the auxiliary device 40 beginning at corresponding start time $t_{n+1}$ and ending at corresponding end time wherein the third page 200C includes metadata specific to content frames/scenes within times $t_{n+1}$ and $t'_{+1}$ of the content.

Figure 6:
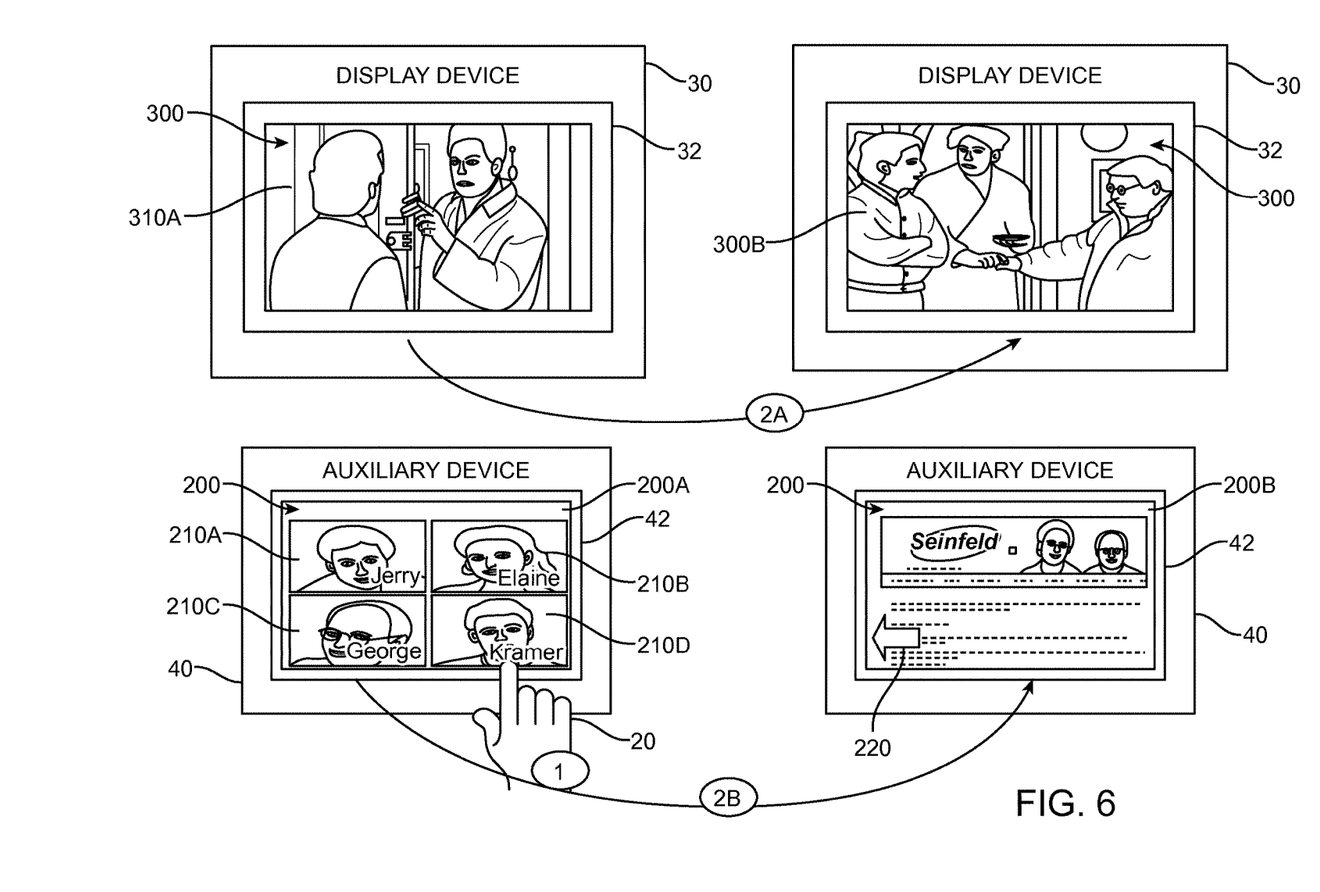
FIG. 6 illustrates example point-to-point content navigation using the auxiliary device 40, in accordance with an embodiment of the invention.

FIG. 6 illustrates example point-to-point content navigation using the auxiliary device 40, in accordance with an embodiment of the invention. During content playback of a piece of content 300 representing an episode of the television program "Seinfeld", the auxiliary device 40 displays pages 200 of metadata associated with the piece of content 300. For example, as shown in FIG. 6, for a current frame 310A, the auxiliary device 40 displays a first page 200A of metadata including multiple navigation links 210 related to characters referenced in the dialogue/scene of the current frame 310A. For example, the first page 200A includes a first navigation link 210A displaying and referencing a first "Seinfeld" character ("Jerry"), a second navigation link 210B displaying and referencing a second "Seinfeld" character ("Elaine"), a third navigation link 210C displaying and referencing a third "Seinfeld" character ("George"), and a fourth navigation link 210D displaying and referencing a fourth "Seinfeld" character ("Kramer").

When the user 20 selects one of the navigation links 210, the content displayed on the display device 30 will jump to an earlier scene in the episode that includes the character referenced by the selected navigation link 210. Specifically, when the user 20 selects a selectable navigation link 210, the content navigation control unit 440 of the point-to-point content navigation app 41 generates controls signals including destination content information. The destination content information comprises an identifier of destination content for display on the display device 30, and a time or content frame indicator indicating a destination time or a destination content frame to commence/begin the display of the destination content from. The destination content is associated with the selected navigation link 210.

Based on the destination content information received, jump-style navigation unit 510 of the control flow application module 51 changes/adjusts the content provided to the display device 30. The control flow application module 51 will provide the destination content to the display device 30, wherein the playback of the destination content starts at the destination time or the destination content frame indicated in the destination content information. The auxiliary device 40 simultaneously displays a page 200 of metadata associated with the destination content at the destination time or the destination content frame. The page 200 may further include a selectable return link/button 220 referencing a point in the content before the jump. When the user selects the return link/button 220, the control flow application module 51 switches the content displayed on the display device 30 from the destination content back to the content frame displayed before the jump.

For example, as represented by action bubble 1 in FIG. 6, when the user 20 selects the fourth navigation link 210D displaying the character Kramer, the control flow application module 51 begins streaming destination content referenced by the fourth navigation link 210D to the display device 30. As represented by action bubble 2A in FIG. 6, the display device 300 displays a different content frame 300B associated with the character Kramer, and starts content playback from content frame 300B onwards. The different content frame 300B may be a different scene from the same episode (e.g., an earlier scene from the same episode), or from a different episode (e.g., an earlier episode) of the television program "Seinfeld". As represented by action bubble 2B in FIG. 6, the auxiliary device 40 simultaneously displays a second page 200B of metadata associated with the different scene 300B. The different page 200B of metadata includes a selectable return link/button 220 for returning to the content frame 310A of the episode.

Figure 7:
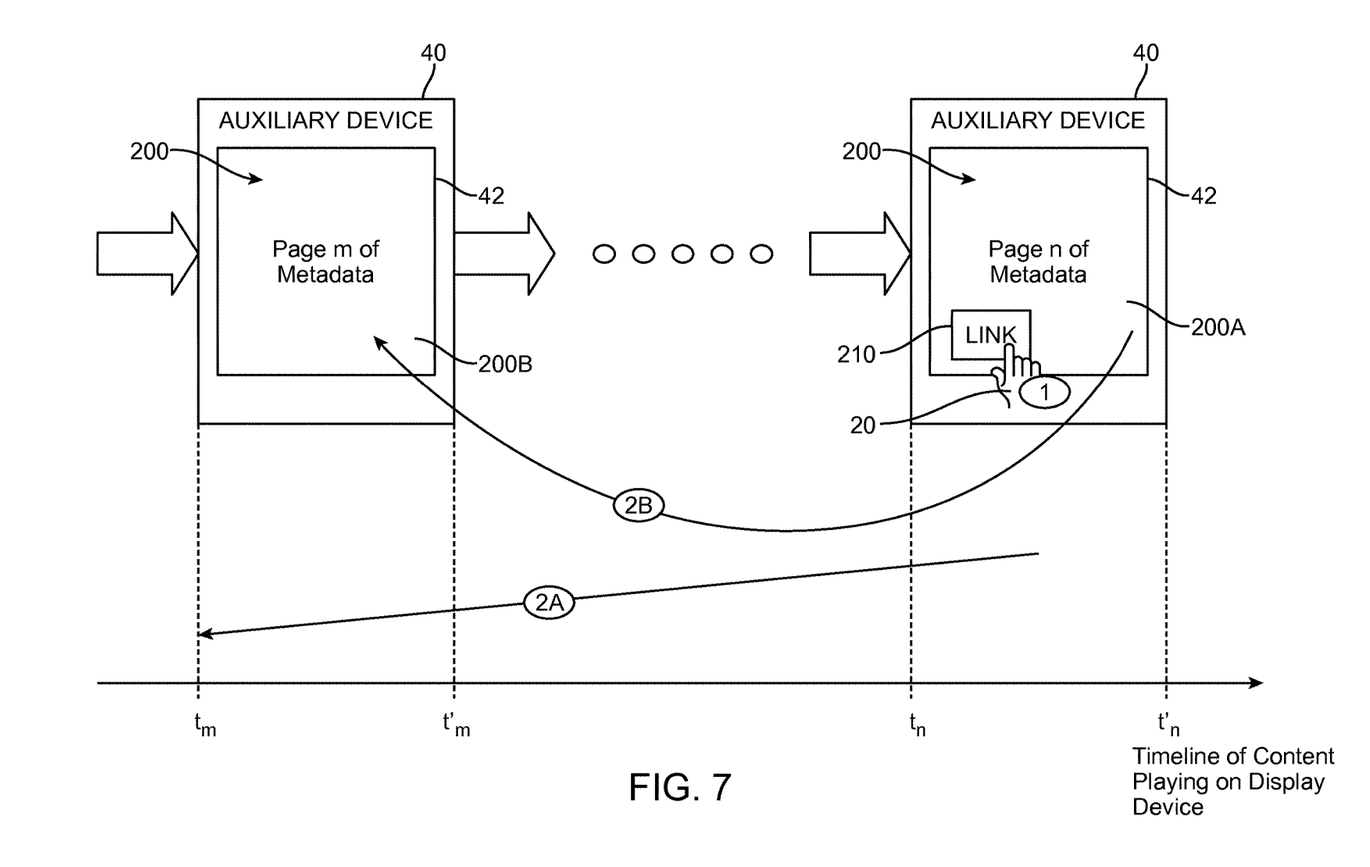
FIG. 7 is a timeline illustrating an example point-to-point content navigation where the playback of content jumps to an earlier time or content frame of the content, in accordance with an embodiment of the invention.

FIG. 7 is a timeline illustrating an example point-to-point content navigation where the playback of content jumps to an earlier time or content frame of the content, in accordance with an embodiment of the invention. At time $t_n$ of the content, the auxiliary device 40 displays a page first 200A of metadata ("Page n of Metadata") associated with a current content frame positioned at time $t_n$ of the content. The page 200A includes a selectable navigation link 210 that references an earlier content frame positioned at time $t_m$ of the content, wherein $t_m < t_n$ (i.e., the earlier content frame precedes the current content frame). When the user selects the link 210, as represented by action bubble 1 in FIG. 7, the control flow application module 51 begins streaming, to the display device 30, content from the earlier content frame positioned at the time $t_m$. The display device 30 begins content playback from the earlier content frame, as indicated by action bubble 2A in FIG. 7. As represented by action bubble 2B in FIG. 7, the auxiliary device 40 simultaneously displays a second page 200B of metadata associated with the earlier content frame.

Figure 8:
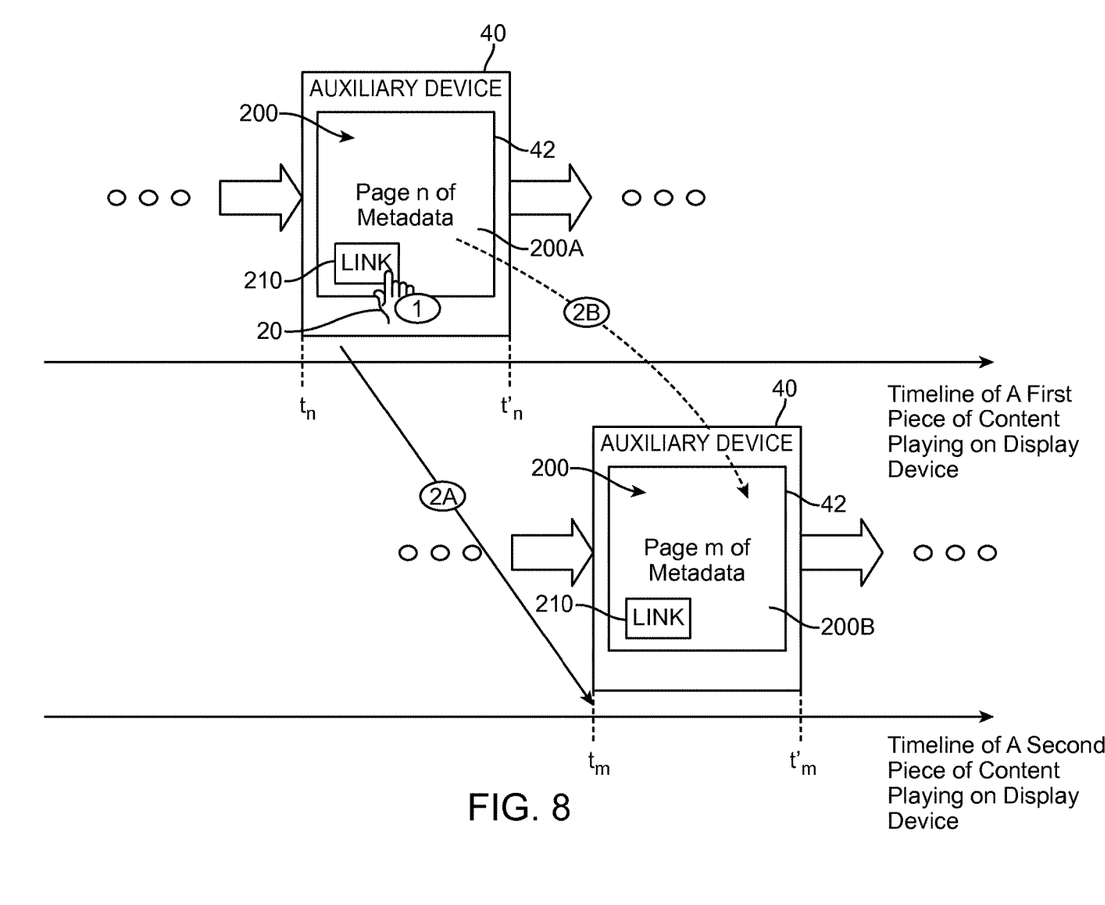
FIG. 8 is a timeline illustrating an example point-to-point content navigation where the playback of content jumps to a different piece of related content, in accordance with an embodiment of the invention.

FIG. 8 is a timeline illustrating an example point-to-point content navigation where the playback of content jumps to a different piece of related content, in accordance with an embodiment of the invention. During content playback of a first piece of content on the display device 30, the auxiliary device 40 displays a first page 200A of metadata ("Page n of Metadata") at time $t_n$ of the first piece of content, wherein the first page 200A includes metadata associated with a content frame within the first piece of content beginning at time $t_n$. The first page 200A includes a selectable navigation link 210 that references a different content frame located at time $t_m$ within a second piece of content, wherein the second piece of content is related to the first piece of content. For example, if the first piece of content is an episode of a television program, the second piece of content may be a different episode of the television program (e.g., the second piece of content may be an earlier episode that precedes the first piece of content and which is referenced by dialogue included in the first piece of content).

When the user selects the link 210, as represented by action bubble 1 in FIG. 8, the control flow application module 51 changes the content streamed to the display device 30. Instead of continuing to stream the first piece of content to the display device 30, the control flow application module 51 begins streaming the second piece of content to the display device 30, wherein the streaming of the second piece of content begins at the content frame located at time $t_m$ of the second piece of content. Further, as represented by action bubble 2B in FIG. 8, the auxiliary device 40 simultaneously displays a second page 200B of metadata associated with the content frame located at time $t_m$ of the second piece of content.

Figure 9:
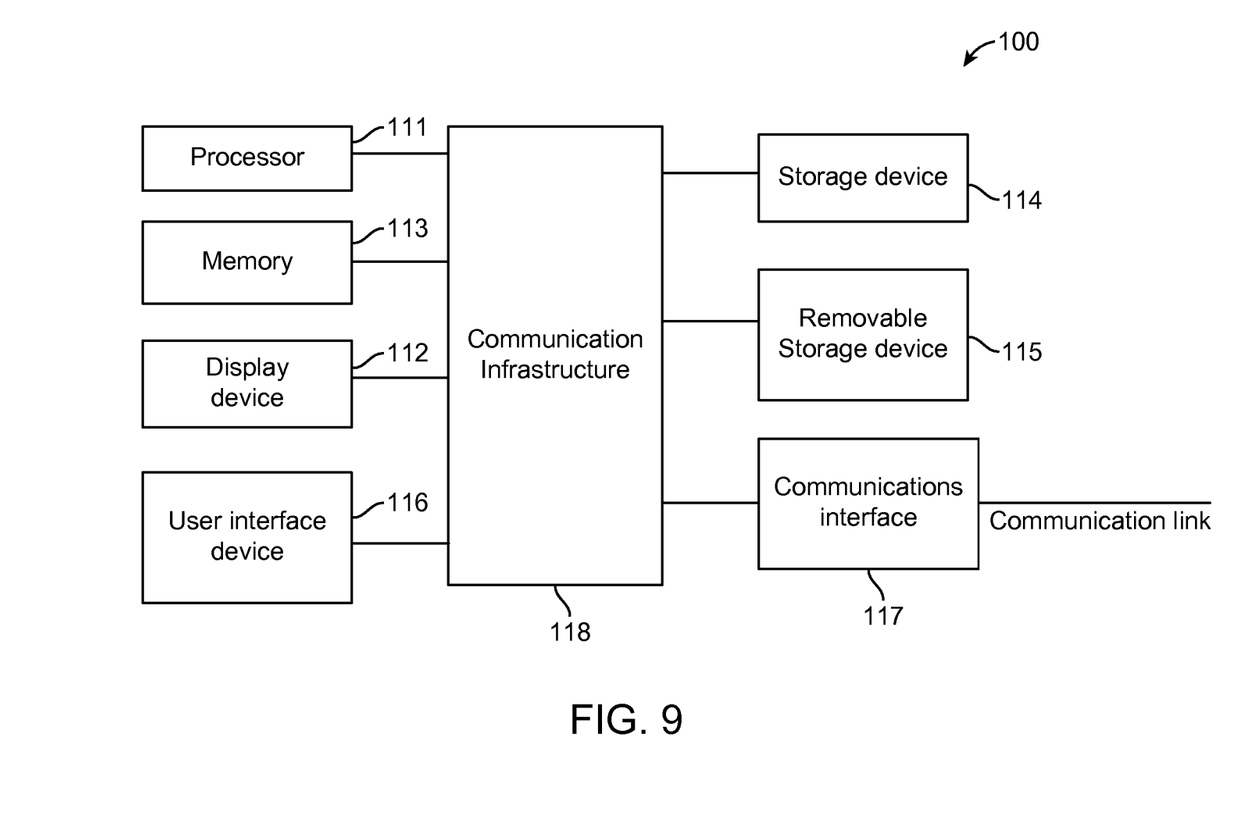
FIG. 9 is a high level block diagram showing an information processing system comprising a computer system useful for implementing an embodiment of the present invention.

FIG. 9 is a high level block diagram showing an information processing system comprising a computer system 100 useful for implementing an embodiment of the present invention. The computer system 100 includes one or more processors 111, and can further include an electronic display device 112 (for displaying graphics, text, and other data), a main memory 113 (e.g., random access memory (RAM)), storage device 114 (e.g., hard disk drive), removable storage device 115 (e.g., removable storage drive, removable memory module, a magnetic tape drive, optical disk drive, computer readable medium having stored therein computer software and/or data), user interface device 116 (e.g., keyboard, touch screen, keypad, pointing device), and a communication interface 117 (e.g., modem, a network interface (such as an Ethernet card), a communications port, or a PCMCIA slot and card). The communication interface 117 allows software and data to be transferred between the computer system and external devices. The system 100 further includes a communications infrastructure 118 (e.g., a communications bus, network) to which the aforementioned devices/modules 111 through 117 are connected.

Information transferred via communications interface 117 may be in the form of signals such as electronic, electromagnetic, optical, or other signals capable of being received by communications interface 117, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

What is claimed is:

1. A system, comprising:
   at least one processor; and
   a non-transitory processor-readable memory device storing instructions that when executed by said at least one processor causes said at least one processor to perform operations including:
   receiving timing information identifying a first content frame of a first piece of content that is currently displayed on a first device;
   generating, via an application on a second device, a first graphical user interface (GUI) comprising first metadata information specific to one or more items referenced in a dialogue of at least said first content frame in response to receiving said timing information, wherein said first GUI has a corresponding start time and a corresponding end time indicating when to begin displaying said first GUI and when to stop displaying said first GUI, respectively, during content playback of said first piece of content, and said application is configured to generate different GUIs comprising different metadata information specific to different content frames of said first piece of content;
   based on said timing information, said start time, and said end time, synchronizing display of said first GUI on said second device with display of said first content frame on said first device during said content playback of said first piece of content on said first device; and
   enabling content navigation on said first device based on interaction with said first GUI on said second device, wherein said first GUI further comprises a first selectable component identifying a second content frame related to said one or more items referenced in said dialogue, and said content navigation comprises simultaneously displaying said second content frame and a second GUI comprising second metadata information specific to at least said second content frame on said first device and said second device, respectively, in response to a selection of said first selectable component.

2. The system of claim 1, wherein:
   said first device comprises a display device including a first display unit for displaying content;
   said second device comprises an auxiliary device including a second display unit for displaying metadata information; and
   said application is downloaded to or pre-loaded on said auxiliary device.

3. The system of claim 2, wherein:
   said first selectable component comprises a selectable navigation link associated with said second content frame.

4. The system of claim 3, wherein:
   said second content frame is a content frame of one of: said first piece of content, or a second piece of content related to said first piece of content.

5. The system of claim 3, wherein said operations further comprise:
   generating a control signal when said navigation link is selected during said interaction with said first GUI, wherein said control signal comprises information identifying said second content frame, said control signal triggers provision of said second content frame to said display device for display, and said display device begins said content playback from said second content frame in response to receiving said second content frame.

6. The system of claim 5, wherein said operations further comprise:
   generating, via said application, said second GUI; and
   synchronizing display of said second GUI on said auxiliary device with display of said second content frame on said display device.

7. The system of claim 6, wherein:
   said second GUI further comprises a selectable return link associated with said first content frame; and
   said content playback of said first piece of content on said display device resumes from said first content frame in response to a selection of said return link during interaction with said second GUI on said second device.

8. A method, comprising:
   receiving timing information identifying a first content frame of a first piece of content that is currently displayed on a first device;
   generating, via an application on a second device, a first graphical user interface (GUI) comprising first metadata information specific to one or more items referenced in a dialogue of at least said first content frame in response to receiving said timing information, wherein said first GUI has a corresponding start time and a corresponding end time indicating when to begin displaying said first GUI and when to stop displaying said first GUI, respectively, during content playback of said first piece of content, and said application is configured to generate different GUIs comprising different metadata information specific to different content frames of said first piece of content;
   based on said timing information, said start time, and said end time, synchronizing display of said first GUI on said second device with display of said first content frame on said first device during said content playback of said first piece of content on said first device; and
   enabling content navigation on said first device based on interaction with said first GUI on said second device, wherein said first GUI further comprises a first selectable component identifying a second content frame related to said one or more items referenced in said dialogue, and said content navigation comprises simultaneously displaying said second content frame and a second GUI comprising second metadata information specific to at least said second content frame on said first device and said second device, respectively, in response to a selection of said first selectable component.

9. The method of claim 8, wherein:
said first device comprises a display device including a first display unit for displaying content;
said second device comprises an auxiliary device including a second display unit for displaying metadata information; and
said application is downloaded to or pre-loaded on said auxiliary device.

10. The method of claim 9, wherein:
said first selectable component comprises a selectable navigation link associated with said second content frame.

11. The method of claim 10, wherein:
said second content frame is a content frame of one of: said first piece of content, or a second piece of content related to said first piece of content.

12. The method of claim 10, further comprising:
in response to a selection of said navigation link during said interaction with said first GUI:
pausing said display of said first content frame on said display device; and
displaying said second content frame on said display device, wherein said display device begins said content playback from said second content frame.

13. The method of claim 12, further comprising:
generating, via said application, said second GUI; and
synchronizing display of said second GUI on said auxiliary device with display of said second content frame on said display device.

14. The method of claim 13, wherein:
said second GUI further comprises a selectable return link associated with said first content frame.

15. The method of claim 14, further comprising:
resuming said content playback of said first piece of content on said display device from said first content frame in response to a selection of said return link during interaction with said second GUI on said second device.

16. A non-transitory computer-readable medium having instructions which when executed on a computer perform a method comprising:
receiving timing information identifying a first content frame of a first piece of content that is currently displayed on a first device;
generating, via an application on a second device, a first graphical user interface (GUI) comprising first metadata information specific to one or more items referenced in a dialogue of at least said first content frame in response to receiving said timing information, wherein said first GUI has a corresponding start time and a corresponding end time indicating when to begin displaying said first GUI and when to stop displaying said first GUI, respectively, during content playback of said first piece of content, and said application is configured to generate different GUIs comprising different metadata information specific to different content frames of said first piece of content;
based on said timing information, said start time, and said end time, synchronizing display of said first GUI on said second device with display of said first content frame on said first device during said content playback of said first piece of content on said first device; and
enabling content navigation on said first device based on interaction with said first GUI on said second device, wherein said first GUI further comprises a first selectable component identifying a second content frame related to said one or more items referenced in said dialogue, and said content navigation comprises simultaneously displaying said second content frame and a second GUI comprising second metadata information specific to at least said second content frame on said first device and said second device, respectively, in response to a selection of said first selectable component.

17. The medium of claim 16, wherein:
said first device comprises a display device including a first display unit for displaying content;
said second device comprises an auxiliary device including a second display unit for displaying metadata information;
said application is downloaded to or pre-loaded on said auxiliary device;
said first selectable component comprises a selectable navigation link associated with said second content frame; and
said second GUI further comprises a selectable return link associated with said first content frame.

18. The medium of claim 17, the method further comprising:
in response to a selection of said navigation link during said interaction with said first GUI:
pausing said display of said first content frame on said display device; and
displaying said second content frame on said display device, wherein said display device begins said content playback from said second content frame.

19. The medium of claim 18, the method further comprising:
generating, via said application, said second GUI; and
synchronizing display of said second GUI on said auxiliary device with display of said second content frame on said display device.

20. The medium of claim 19, the method further comprising:
resuming said content playback of said first piece of content on said display device from said first content frame in response to a selection of said return link during interaction with said second GUI on said second device.

21. The system of claim 1, wherein said first metadata information of said first GUI is further specific to one or more items displayed in a scene of at least said first content frame.

22. The method of claim 8, wherein said first metadata information of said first GUI is further specific to one or more items displayed in a scene of at least said first content frame.

23. The medium of claim 16, wherein said first metadata information of said first GUI is further specific to one or more items displayed in a scene of at least said first content frame.

* * * * *